United States Patent
Bauer et al.

(10) Patent No.: US 8,593,165 B2
(45) Date of Patent: Nov. 26, 2013

(54) SOLAR GENERATOR

(71) Applicant: Deutsches Zentrum für Luft-und Raumfahrt e.V., Köln (DE)

(72) Inventors: Waldemar Bauer, Schwanewede (DE); Oliver Romberg, Bremen (DE)

(73) Assignee: Deutsches Zentrum fur Luft- und Raumfahrt e.V., Cologne (DE)

(*) Notice: Subject to any disclaimer, the term of this patent is extended or adjusted under 35 U.S.C. 154(b) by 15 days.

(21) Appl. No.: 13/735,725

(22) Filed: Jan. 7, 2013

(65) Prior Publication Data
US 2013/0176049 A1 Jul. 11, 2013

(30) Foreign Application Priority Data
Jan. 10, 2012 (DE) .................. 10 2012 000 260

(51) Int. Cl.
*G01R 31/26* (2006.01)

(52) U.S. Cl.
USPC ............. 324/761.01; 324/693; 324/543

(58) Field of Classification Search
USPC ............. 324/501, 525, 543, 555, 655, 693, 324/761.01; 340/12.51, 10.1, 10.4
See application file for complete search history.

(56) References Cited

U.S. PATENT DOCUMENTS

2011/0050258 A1* 3/2011 Katazawa et al. ............. 324/693
2011/0210749 A1* 9/2011 Williams et al. ............. 324/543

FOREIGN PATENT DOCUMENTS

EP 2 236 422 A1 10/2010
JP 10-300395 A 11/1998

OTHER PUBLICATIONS

Schafer et al, Impact Sensor network for detection of hypervelocity impacts on spacecraft, May 10, 2007, Acta Astronautica, vol. 61, pp. 901-911.*

* cited by examiner

*Primary Examiner* — Jermele M Hollington
*Assistant Examiner* — Adam Clarke
(74) *Attorney, Agent, or Firm* — Hoffmann & Baron, LLP

(57) ABSTRACT

A solar generator for spacecraft or satellites, including a solar panel, a detector layer, a first evaluation means and a second evaluation means. The solar panel includes a plurality of solar cells. The detector layer includes first conductors substantially in parallel in a first plane and second conductors substantially in parallel in a second plane. The second plane is substantially in parallel to the first plane such that the first conductors are at an angle to the second conductors. The first evaluation means is for detecting a failure of one or more of the plurality of solar cells. The second evaluation means is for testing electrical status of the first conductors and the second conductors to determine whether the failure detected by the first evaluation means was caused by a space object damaging or severing one or more of the first conductors and the second conductors.

11 Claims, 5 Drawing Sheets

SOLAR GENERATOR

CROSS REFERENCE TO RELATED APPLICATION

This application claims priority to German Patent Application No. 102012000260.2, filed on Jan. 10, 2012, which is incorporated herein by reference in its entirety.

BACKGROUND

1. Field of Technology

The present disclosure relates to a solar generator for spacecraft or satellites. More particularly, the present disclosure is directed to a solar generator that makes it possible to better assess occurrences of failure of single or multiple solar cells.

2. Brief Discussion of Related Art

Spacecraft and satellites are commonly known to use solar generators for generating energy in space. Typically, solar generators comprise large solar panels and solar cells that are deployable in space and which convert light into electrical energy, in addition to control electronics and suitable cabling. In spite of extensive ground tests, one or more solar cells of the solar generators fail during space missions. Causes thereof include faulty solar cells or cells damaged during launch, aging of solar cells or the solar generators (during longer space missions), and in particular collision with objects in space.

Due to their large flat surface area, solar panels in particular are at risk of potentially colliding with space objects, that is, naturally occurring micrometeorites and "space debris" generated by human space activity. While the danger caused by naturally occurring micrometeorites remains temporally virtually unchanged, the risk of collision with so-called space debris at least in earth orbit has continually increased over the past decades. In the present case, micrometeorites and space debris are referred to collectively as "space objects" (e.g., MMOD or "micro-meteroid and orbital debris"). The damage caused to solar generators due to collision with such space objects given their high relative velocity (several kilometers per second) can be severe even in the case of small sized particles, to the point of resulting in the aborting of a mission. Frequently, colliding space objects puncture the solar panels thereby destroying single or multiple solar cells.

Simulation models have been developed to assess the risk of space flight missions (e.g., MASTER, ORDEM), which allow conclusions to be drawn about the distribution of space objects. A crucial factor in this assessment is the verification of analytical methods pertaining to the space debris environment. Most space objects are too small for purposes of ground-based locating methods, as the frequency of the space objects is reciprocal to their size. Hence, there is a great need for experimental on-the-ground confirmation of the distribution of space debris and with that a further need for determining the actual causes of solar cell or solar generator failures.

SUMMARY

The object of the present disclosure is to specify a solar generator which makes it possible to better assess occurrences of failure of single or multiple solar cells.

The solar generator is set forth in the independent claims. Advantageous refinements and configurations thereto are the subject matter of the dependent claims. Additional features, potential applications and advantages of the solar generator are set forth in the following description, and in the explanation of the example embodiments depicted in the figures.

The object is achieved with a solar generator for spacecraft or satellites in accordance with the present disclosure. The solar generator according to the present disclosure comprises at least one solar panel with a layer of solar cells disposed on an upper side of the solar panel, the layer including a plurality of flat solar cells arranged side by side which convert incident electromagnetic radiation into electrical current, further a first detector layer arranged on a side of the layer of solar cells which faces away from the upper side of the solar panel, wherein the first detector layer consists of an electrically insulating material, in which a plurality of first electrical conductors arranged substantially parallel are imbedded in a first plane, and a plurality of second, substantially parallel electrical conductors are imbedded in a plane arranged substantially parallel to said first plane, wherein the first electrical conductors are arrayed at an angle, preferably at a 10°-, 20°-, 30°-, 40°-, 50°-, 60°-, 70°-, or 80°-angle, more preferably at a 45°- or 90°-angle relative to the second electrical conductors, and there is a known association between each solar cell and first and second conductors which pass within the solar panel in the area below each solar cell, further a first evaluation means connected to the solar cells and by means of which a failure of individual or multiple solar cells can be individually detected, and a second evaluation means which is connected to the first evaluation means and to the first and second electrical conductors, and which is designed and configured so that when a failure of one or more solar cells is detected by the first evaluation means, it is possible to test the physical integrity of the first and second conductors via an analysis of an electrical status of the first and second electrical conductors to determine whether the failure was caused by a collision with a space object which also damaged, in particular severed, one or more of the first and the second conductors.

The first and second planes are arranged preferably parallel to one another. In the present application the term "substantially parallel" is understood to mean an arrangement of the first and second electrical conductors, respectively, the first and second planes with an angular deviation from the ideal parallelism of ±2°, in particular ±1° or ±0.5°, wherein adjacent first and second conductors must not be in contact, and the first and second planes must not intersect within the area of the solar panel. This applies by analogy also to the third and fourth electrical conductors and to the third and fourth planes described further below.

The solar generator according to the present disclosure is based on the idea of further developing the solar panels of a solar generator in such a way that it is possible to detect impacts or punctures by space objects in the event of collisions. Thus, if one or more solar cells should fail, it is possible to determine those occurrences of failure that are attributable to a collision between the solar panels and space objects.

For this purpose the solar panels comprise a first detector layer arranged on a side of the layer of solar cells facing away from the upper side of the solar panels. The detector layer consists of an electrically insulating material, preferably a plastic, a plastic laminate, a resin, a GFK material, a CFK material, a ceramic material, glass, a silicon material or a combination of the aforementioned materials. The detector layer is preferably arranged immediately following the layer of solar cells, wherein an adhesive bonding layer may be disposed between the layer of solar cells and the first detector layer. Also preferably disposed between the layer of solar cells and the first detector layer is a separating layer which in turn preferably includes an electrically conductive fabric for purposes of electromagnetic shielding. The electromagnetic shield functions in particular as protection against electrical fields which arise as a result of electrostatic discharge, as explained further below. Preferably, the first detector layer is completely surrounded by an electromagnetic shield.

The electrically insulating material of the first detector layer includes a plurality of first electrical (longitudinal) conductors arranged substantially parallel and imbedded in a first plane, and a plurality of second, substantially parallel electrical (longitudinal) conductors imbedded in a plane arranged substantially parallel to said first plane, wherein the first electrical conductors are arranged preferably perpendicular to the second electrical conductors. The first and the second planes are arranged a distance apart, which distance on the one hand is as small as possible, and which on the other hand electrically insulates the first conductors from the second conductors. By embedding the first and the second electrical conductors in the electrical insulating material (that is, the first and second conductors are preferably not arranged on a surface of the first detector layer), secondary damage to other first and second conductors located away from the puncture channel (caused by colliding space objects) can be largely avoided. The first and second conductors are preferably round or rectangular in cross-section. Preferred widths or diameters of such a first or second conductor are on the order of 1 to 500 μm, of 1 to 100 μm, of 10 to 75 μm, of 25 to 65 μm, or of 35 to 50 μm. The distance between adjacent conductors is preferably the same for all conductors and is preferably twice as great as the width or diameter of the conductors. Naturally, other dimensions of the space and of the first and second conductors are also possible, depending on the task and application involved. Preferably, the first and second conductors have an extension (width/diameter) perpendicular to their respective longitudinal axis which corresponds to a lower limit of the dimensions of a space object which, upon collision, is still detectable by the first detector layer. Thus, by dimensioning the first and second conductors and setting the distance between adjacent conductors, a lower size limit for detecting space objects is established. Space objects sized smaller than this limit cannot be resolved and therefore cannot be detected.

If a space object collides with the solar panel, the damage incurred is dependent on the size, angle of impact and the relative velocity of the space object. Frequently, the relative velocity of space objects is sufficiently great such that the latter, even those 1 micrometer to several millimeters in size, puncture the solar panel. In other cases, the space objects upon collision destroy only one or more solar cells without fully penetrating the first detector layer and disrupting or damaging first or second conductors. Such cases are not further considered herein since in the present case they allow no further analysis other than the observation of one or more damaged solar cells.

Under the impact of the space object, the solar cells of the solar panel disposed in the area of impact are mechanically destroyed and fail as a result. Furthermore, electrostatic charging of the surface of the solar panels and material ejected upon impact at the point of impact can result in a plasma discharge that can also disrupt the functioning of, or even destroy, surrounding solar cells, that is, solar cells that are not mechanically struck as a result of the collision with the space object, such that they, too, fail as a result of the collision or the impact.

According to the present disclosure, a first evaluation means monitors the functioning of the solar cells and/or detects a failure of one or more solar cells. The solar cells are preferably connected individually or in groups of solar cells (for example, as individual columns or rows) with the first evaluation means. The electrical circuitry suitable for monitoring or for failure detection is familiar to the person skilled in the art. Thus, the first evaluation means merely detects the failure of one or more solar cells; it does not determine the cause of the failure.

For purposes of illustration, it is assumed that when a space object collides with the solar panels, the space object completely penetrates the solar panels, thereby leaving behind a puncture channel in the solar panels. Upon puncture, one or more of the first and second conductors passing beneath the affected solar cells in the area of impact are severed. Which specific conductors are affected can easily be determined via the second evaluation means by analyzing the electrical status of the first and second conductors. For this purpose, it is possible, for example, to measure the conductivity or resistance of individual conductors.

To avoid having to analyze the electrical status of all first and second conductors with every collision, in a preferred refinement the second evaluation means is designed and configured so that in the event of a failure of one or more solar cells detected by the first evaluation means, the electrical status of just those first and second conductors is analyzed which according to the known associations, are associated with the failed solar cell or cells, that is, are arranged within the solar panel beneath the surface covered by the failed solar cell. This reduces considerably the energy required for monitoring and analysis.

The second evaluation means is able to determine a point of impact and size of the space object by an analysis of the electrical status of the first and second conductors as a result of the arrangement of the first and second conductors at a known angle, preferably at a 45°- or 90° angle, relative to one another. The point is revealed by the point of intersection of the first and second conductors that are damaged upon entry through the first detector layer. It is at least possible to estimate the size of the space object by the number of adjoining damaged first and second conductors. This information can be stored and/or transmitted to a center (for example, a ground control station or a spacecraft) for further evaluation. The solar cells or surfaces thereof affected by failure as a result of the plasma discharges described above could be many times greater than the cross-sectional area of the puncture channel detected in the first detector layer A preferred refinement of the solar generator according to the present disclosure is distinguished by a structural layer arranged on a side of the first detector layer opposite the layer of solar cells, preferably immediately adjoining it, which structural layer serves to reinforce the solar panels. Preferably, the structural layer has a honeycomb structure, but may also include any other reinforcing structure familiar to the person skilled in the art.

A preferred refinement of the solar generator according to the present disclosure is distinguished by a second detector layer arranged on a lower surface of the solar panels opposite the upper side of the latter, which detector layer consists of an electrically insulating material, in which a plurality of third electrical conductors arranged substantially parallel are imbedded in a third plane, and a plurality of fourth, substantially parallel electrical conductors are imbedded in a fourth plane arranged substantially parallel to said third plane, wherein the third electrical conductors are arrayed at an angle, preferably at a 10°-, 20°-, 30°-, 40°-, 50°-, 60°-, 70°-, or 80°-angle, more preferably at a 45°- or 90°-angle relative to the fourth electrical conductors, and there is a known association between each solar cell and third and fourth conductors which pass within the solar panel in the area below each solar cell.

In this further refinement, the second evaluation means is connected to the third and fourth electrical conductors, and is designed and configured so that when a failure of one or more solar cells is detected by the first evaluation means, it is possible to test the physical integrity of the third and fourth conductors by an analysis of an electrical status of the third and fourth electrical conductors to determine whether the failure was caused by a collision with a space object which also damaged, in particular severed, one or more of the third and the fourth conductors.

The foregoing explanations in connection with the first detector layer preferably apply analogously to the second detector layer and the second evaluation means. Insofar as this is the case, we refer to the explanations above.

The second detector layer is preferably arranged on a side of the structural layer facing the under surface of the solar panels. In this case, this results in the following preferred layered structure (from top to bottom):
upper side of the solar panel with layer of solar cells
first detector layer with first and second conductors arranged therein
structural layer
second detector layer with third and fourth conductors arranged therein
underside of solar panels.

In this configuration, the solar panel therefore includes two detector layers for detecting a collision with a space object. Each of the third and fourth conductors preferably extends perpendicular to its respective longitudinal axis which corresponds to a lower limit of the dimensions of a space object which is still detectable by the first detector layer.

In addition, the second evaluation means is preferably designed and configured to determine an arrival direction and/or arrival velocity of the colliding space object based on an analysis of the electrical status of the third and fourth electrical conductors. The arrival direction is approximated on the basis of the simple geometric relation between the point of entry of the space object through the first and the second detector layer and the distance between the first and second detector layer.

A further advantageous refinement of the solar generator according to the present disclosure is distinguished by the fact that the first and/or the second detector layer include a conductive fabric structure which services as an electromagnetic shield for the respective detector layer. In this case, the fabric structure is preferably arranged at the surface of the first/second detector layer.

Thus, the first and second conductors and the third and fourth conductors are preferably permanently integrated in the solar panel structure and are not directly exposed to the environment of space. The first to fourth conductors remain functionally intact as long as they are not directly severed by an impact.

Naturally, space objects arrive from different directions, that is, in particular, at the underside (backside) of the solar panels. When this happens, as long as the space objects only penetrate into the second detector layer or into the second and first detector layer and do not destroy any solar cell(s) in terms of their functionality, then no initial analysis of the conductors is performed by the second evaluation means, since in such cases there is no solar cell failure being recorded. Therefore, it is also proposed to record and document, to conduct an electrical analysis at prescribed intervals of all first, second, third and fourth conductors and in addition to evaluate collision events (point of the collision on the solar panel, size of space object, angle of arrival) and to store or to transmit to a center even those collision events which do not result in a failure of solar cells, but merely damage or destroy conductors in the second and, if applicable, first detector layer.

Further advantages, features and details are set forth in the following description in which example embodiments are described in detail with reference to the drawings. Features that are described and/or depicted form per se or in any desired, meaningful combination the subject matter of the present disclosure, where appropriate, even independently of the claims, and may in particular also form the subject matter of one or more separate application(s). Identical, similar and/or functionally equivalent parts are assigned the same reference numerals.

DETAILED DESCRIPTION

Figure 1:
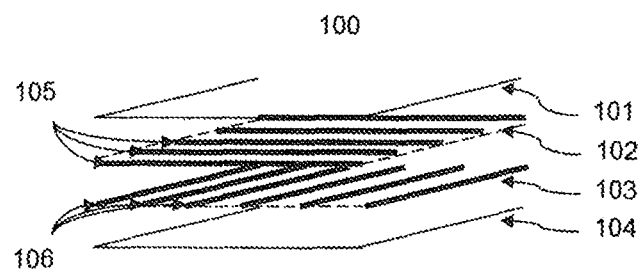
FIG. 1 is a schematic design of a first detector layer.

FIG. 1 is a side, cross-sectional view of a schematic design of a first detector layer 100. The flat expansive detector layer 100 has an upper side 101 and an underside 104. The detector layer 100 comprises an electrically insulating material, such as for example, plastic or a plastic laminate. In this insulating material a plurality of first electrical conductors 105 arranged in parallel are imbedded in a first plane 102, and a plurality of second electrical conductors 106 arranged in parallel are imbedded in a second plane 103. The second plane 103 is arranged substantially parallel to the first plane 102, wherein the first electrical conductors 105 are arrayed perpendicularly to the second electrical conductors 106. The first plane 102 and the second plane 103 are preferably a minimum distance apart, but which distance ensures sufficient electrical insulation of the first conductors 105 and the second conductors 106.

Figure 2:
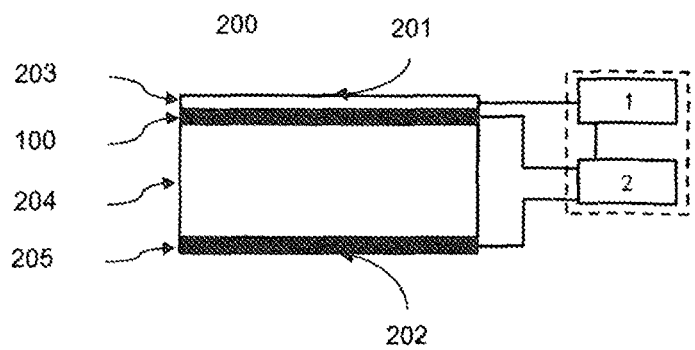
FIG. 2 is a schematic representation of a first embodiment of a solar generator.

FIG. 2 is a schematic view of a first embodiment of a solar generator according to the present disclosure with a cross-sectional view of a solar panel 200. The flat expansive solar panel 200 with an upper side 201 and an underside or backside 202 has the following layered structure (from top to bottom):
layer of solar cells 203;
first detector layer 100;
structural layer 204; and
second detector layer 205.

Figure 5:
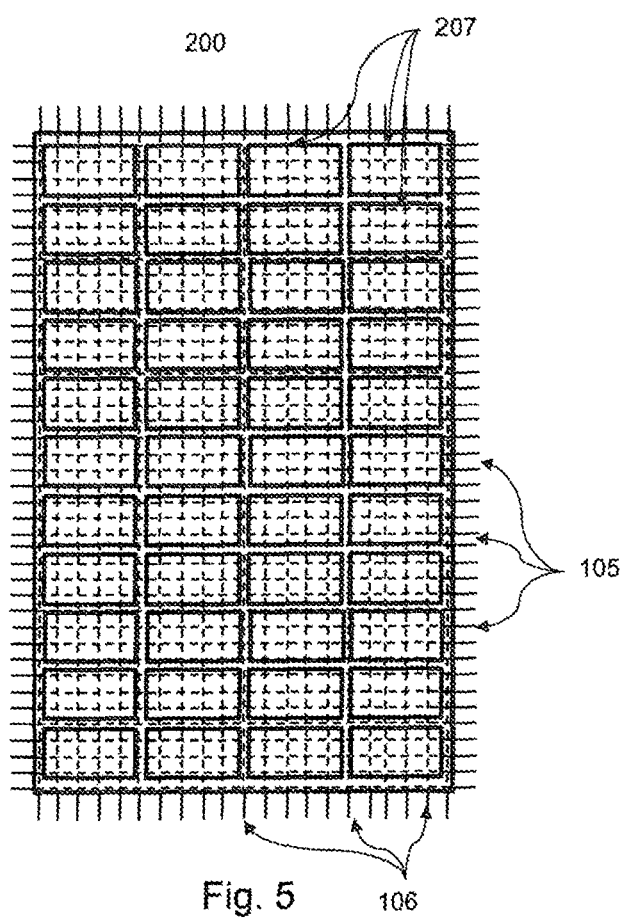
FIG. 5 is a schematic plan view of the upper side of a solar panel.
Figure 6:
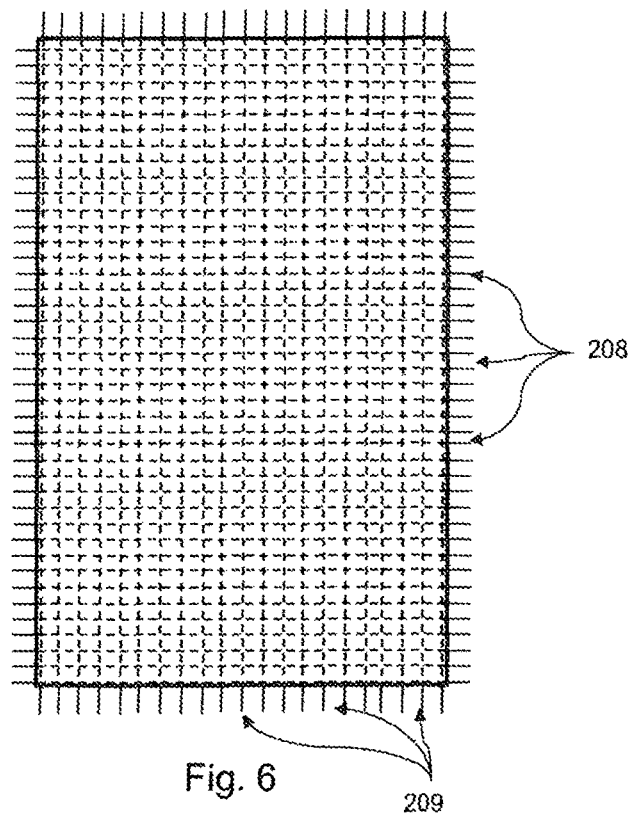
FIG. 6 is a schematic plan view of the underside of a solar panel.

A first evaluation means 1 is connected to the solar cells 207 (as best shown in FIG. 5) and is configured and designed to individually detect a failure of one or several of the solar cells 207. The first evaluation means 1 does not determine the cause of the failure of the solar cell(s) 207. A second evaluation means 2 is connected to the first evaluation means 1 and to the first electrical conductors 105 and the second electrical conductors 106 of the first detector layer 100, as well as to third electrical conductors 208 and fourth electrical conductors 209 of the second detector layer 205 (as best shown in FIG. 6). If the first evaluation means 1 detects a failure of one or of several solar cells 207, the physical integrity of the first electrical conductors 105, the second electrical conductors 106, the third electrical conductors 208 and the fourth electrical conductors 209 is then tested by analyzing the electrical status of the electrical conductors 105, 106, 208 and 209 to determine whether this failure was caused by a collision with a space object which also damaged, in particular severed, one or several of the first electrical conductors 105, 106, 208 and 209. This is done preferably by measuring the conductivity or resistance of all the electrical conductors 105, 106, 208, 209. Preferably, to save energy, the resistance and conductance measurements are performed on just the electrical conductors 105, 106, 208, 209 that are arranged in the solar panel below the surface of the individual failed solar cell(s) 207. The association of the electrical conductors 105, 106, 208, 209 to each of the solar cells 207 is known.

Naturally, the electrical status of the electrical conductors 105, 106, 208, 209 can be analyzed by other suitable methods of measurement familiar to the person skilled in the art.

When a space object penetrates the solar panel 200, a puncture channel is formed. The electrical conductors 105, 106, 208, 209 situated in the puncture channel are accordingly severed by the space object. The above described analysis of the electrical resistance/conductance of the individual electrical conductors 105, 106, 208, 209 makes it possible to identify individually severed electrical conductors 105, 106, 208, 209 and therefore to determine the size and the points of entry of the space object in the first detector layer 100 and second 205 detector layer. In addition, the second evaluation means 2 makes possible at least an estimation of the impact angle of the space object based on the known point of entry in the first detector layer 100 and second detector layer 205.

Figure 3:
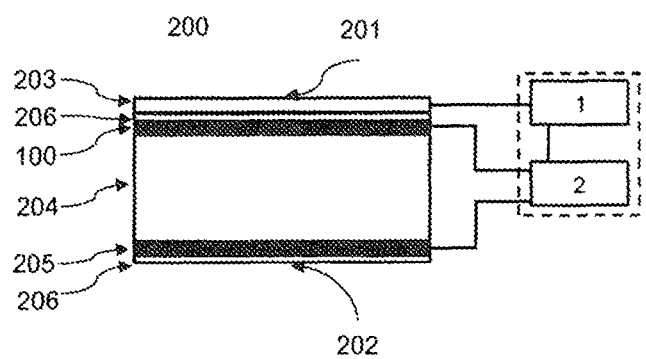
FIG. 3 is a schematic representation of a second embodiment of a solar generator.

FIG. 3 is a schematic representation of a second embodiment of a solar generator. The representation is based on FIG. 2 and differs from FIG. 2 in that a separating layer 206 is arranged on the underside of the solar panels 200 and between the layer of solar cells 203 and the first detector layer 100, respectively. This separating layer 206 preferably comprises an insulating material and further includes a conductive fabric for shielding from electrical fields.

Figure 4:
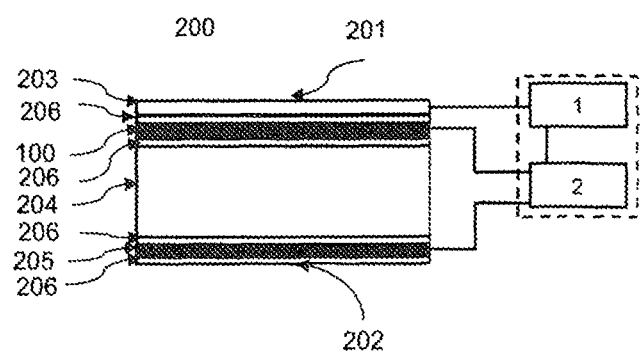
FIG. 4 is a schematic representation of a third embodiment of a solar generator.

FIG. 4 is a schematic representation of a third embodiment of a solar generator. The representation is based on FIG. 3 and differs from FIG. 3 in that a separating layer 206 is arranged between the first detector layer 100 and the structural layer 204, and between the structural layer 204 and the second detector layer 205, respectively. This separating layer 206 preferably comprises an insulating material and further includes a conductive fabric for shielding from electrical fields.

FIG. 5 is a partially transparent representation of an upper side 201 of a solar panel 200 in schematic plan view. Visible on the upper side 201 are the solar cells 207 in grid-like arrangement and arranged beneath these solar cells 207 in the solar panel 200 are the first electrical conductor 105 and second electrical conductor 106 of the first detector layer 100. Each of the electrical conductors 105, 106 is connected to the second evaluation unit 2 (not shown). Clearly visible is the association of the first electrical conductor 105 and the second electrical conductor 106 to the individual solar cells 207, indicated by the perpendicular projection of the surface of the solar cells on the first electrical conductor 105 and second electrical conductor 106 passing through the first detector layer 100. When a solar cell 207 fails, it is possible, based on this known association, to limit an analysis of the electrical status of the first electrical conductor 105 and second electrical conductor 106 to just those conductors that are situated beneath the affected solar cell surfaces.

FIG. 6 is a partially transparent representation of the underside/backside 202 of the solar panel 200 (best shown in FIG. 2) in schematic plan view. Clearly visible are the third electrical conductor 208 and fourth electrical conductor 209 of the second detector layer 205 arranged perpendicularly to one another.

List of Reference Numerals
1 First evaluation means;
2 Second evaluation means;
100 First detector layer;
101 Upper side of the first detector layer;
102 First plane;
103 Second plane;
104 Underside of the first detector layer;
105 First electrical conductor;
106 Second electrical conductor;
200 Solar panel;
201 Upper side of the solar panel;
202 Underside of the solar panel;
203 Layer of solar cells;
204 Structural layer;
205 Second detector layer;
206 Separating layer, optionally with electromagnetically shielding fabric;
207 Solar cell, solar cells;
208 Third electrical conductor; and
209 Fourth electrical conductor.

The invention claimed is:

1. A solar generator for spacecraft or satellites, the solar generator comprising:
   a solar panel including a layer of solar cells arranged on an upper side of the solar panel, the solar cells arranged side by side to convert incident electromagnetic radiation into electrical current;
   a first detector layer arranged on a side of the layer of solar cells that faces away from an upper side of the solar panel, the first detector layer comprises an electrically insulating material in which a plurality of first electrical conductors are arranged substantially in parallel and imbedded in a first plane and a plurality of second electrical conductors are arranged substantially in parallel and imbedded in a second plane, the second plane being arranged substantially in parallel to the first plane such that the first electrical conductors are arranged at an angle to the second electrical conductors, wherein there is a known association between each solar cell and the first electrical conductors and the second electrical conductors that pass within the solar panel in an area beneath each solar cell;
   a first evaluation means connected to the solar cells for detecting a failure of one or several of the solar cells; and
   a second evaluation means connected to the first evaluation means and to the first electrical conductors and the second electrical conductors, the second evaluation means for testing the physical integrity of the first electrical conductors and the second electrical conductors when a failure of the one or several of the solar cells is detected by the first evaluation means by analysis of an electrical status of the first electrical conductors and the second electrical conductors to determine whether the failure was caused by a collision with a space object which damaged or severed one or several of the first electrical conductors and the second electrical conductors.

2. The solar generator according to claim 1, wherein the second evaluation means conducts the analysis of the electrical status for just those first electrical conductors and second electrical conductors which, according to the known association, are associated with failed solar cells.

3. The solar generator according to claim 1, wherein each of the first electrical conductors and the second electrical conductors has an extension perpendicular to its longitudinal axis that corresponds to a lower limit of dimensions of a space object whose collision with the first detector layer is detectable.

4. The solar generator according to claim 1, wherein arranged on a side of the first detector layer opposite the layer of solar cells is a structural layer which serves to reinforce the solar panel.

5. The solar generator according to claim 4, wherein the structural layer has a honeycomb structure.

6. The solar generator according to claim 1, wherein the first detector layer has a conductive fabric structure which serves as an electrostatic shield for the first detector layer.

7. The solar generator according to claim 1, wherein the second evaluation means is further for determining at least one of a point of collision on the solar panel and a size of the space object based on the analysis of the electrical status of the first electrical conductors and the second electrical conductors.

8. The solar generator according to claim 1, wherein:
arranged on an underside of the solar panel opposite the upper side of the solar panel is a second detector layer which comprises an electrically insulating material in which a plurality of third electrical conductors are arranged substantially parallel and imbedded in a third plane and a plurality of fourth electrical conductors are arranged substantially in parallel and imbedded in a fourth plane, the fourth plane being arranged substantially parallel to the third plane such that the third electrical conductors are arranged at an angle to the fourth electrical conductors, wherein there is a known association between each solar cell and the third electrical conductors and the fourth electrical conductors that pass within the solar panel in the area beneath each solar cell; and the second evaluation means is connected to the third electrical conductors and the fourth electrical conductors, the second evaluation means further for testing the physical integrity of the third electrical conductors and the fourth electrical conductors when the failure of the one or several of the solar cells is detected by the first evaluation means by analysis of an electrical status of the third electrical conductors and the fourth electrical conductors to determine whether the failure was caused by a collision with a space object which damaged or severed one or several of the third electrical conductors and the fourth electrical conductors.

9. The solar generator according to claim 8, wherein each of the third electrical conductors and the fourth electrical conductors has an extension perpendicular to its longitudinal axis that corresponds to a lower limit of the dimensions of a space object whose collision with the first detector layer is detectable.

10. The solar generator according to claim 8, wherein the second detector layer has a conductive fabric structure which serves as an electrostatic shield for the second detector layer.

11. The solar generator according to claim 8, wherein the second evaluation means is further for determining at least one of an arrival direction and an arrival velocity of the colliding space object based on the analysis of the electrical status of the third electrical conductors and the fourth electrical conductors.

* * * * *